United States Patent
Jin et al.

(10) Patent No.: US 7,306,133 B2
(45) Date of Patent: Dec. 11, 2007

(54) SYSTEM FOR FABRICATING AN INTEGRATED CIRCUIT PACKAGE ON A PRINTED CIRCUIT BOARD

(75) Inventors: Yonggang Jin, Singapore (SG); Shelley Yong, Singapore (SG); Puay Gek Chua, Singapore (SG); Won Sun Shin, Suwon (KR)

(73) Assignee: ST Assembly Test Services Ltd., Singapore (SG)

( * ) Notice: Subject to any disclaimer, the term of this patent is extended or adjusted under 35 U.S.C. 154(b) by 222 days.

(21) Appl. No.: 10/825,810

(22) Filed: Apr. 16, 2004

(65) Prior Publication Data

US 2004/0211817 A1    Oct. 28, 2004

Related U.S. Application Data

(60) Provisional application No. 60/465,432, filed on Apr. 25, 2003.

(51) Int. Cl.
*B23K 31/02* (2006.01)

(52) U.S. Cl. .............. 228/219; 228/221; 228/248.1

(58) Field of Classification Search ............ 228/42, 228/43, 219, 221; 219/388, 390
See application file for complete search history.

(56) References Cited

U.S. PATENT DOCUMENTS

| | | | |
|---|---|---|---|
| 3,882,596 A * | 5/1975 | Kendziora et al. ......... 228/200 |
| 4,166,563 A | 9/1979 | Peyraud et al. |
| 5,031,818 A * | 7/1991 | Gieskes ................... 228/42 |
| 5,096,110 A * | 3/1992 | Schmatz et al. ........... 228/102 |
| 5,102,032 A * | 4/1992 | Cottone et al. ........... 228/183 |
| 5,188,280 A * | 2/1993 | Nakao et al. ............. 228/123.1 |
| 5,409,543 A * | 4/1995 | Panitz et al. ............. 134/2 |
| 5,454,507 A * | 10/1995 | Tanaka et al. ............ 228/221 |
| 5,516,031 A * | 5/1996 | Nishikawa et al. ........ 228/205 |
| 5,573,174 A * | 11/1996 | Pekol .................... 228/219 |
| 5,799,860 A * | 9/1998 | Demaray et al. ........... 228/194 |
| 6,227,436 B1 * | 5/2001 | Nishikawa et al. ........ 228/180.22 |
| 6,732,911 B2 * | 5/2004 | Matsuki et al. ........... 228/219 |
| 2003/0160088 A1 * | 8/2003 | Mitten et al. ............ 228/219 |
| 2003/0222126 A1 * | 12/2003 | Morozumi et al. ......... 228/219 |

FOREIGN PATENT DOCUMENTS

JP        53-123354 A  * 10/1978

OTHER PUBLICATIONS

Merriam-Webster's Collegiate Dictionary, 10th edition, 1999, pp. 1197-1198.*
Merriam-Webster's Collegiate Thesaurus, 1988, pp. 747-748.*

* cited by examiner

*Primary Examiner*—Kiley Stoner
(74) *Attorney, Agent, or Firm*—Mikiio Ishimaru

(57) ABSTRACT

A system is provided for reflow soldering a part that includes: replacing air around an unsoldered part with a first inert gas; removing the first inert gas to form a vacuum around the unsoldered part; vacuum reflow soldering the unsoldered part to form a reflow-soldered part; providing a second inert gas to fill the vacuum around the reflow-soldered part; and replacing the second inert gas with air around the reflow-soldered part.

10 Claims, 3 Drawing Sheets

SYSTEM FOR FABRICATING AN INTEGRATED CIRCUIT PACKAGE ON A PRINTED CIRCUIT BOARD

CROSS-REFERENCE TO RELATED APPLICATION

This application claims the benefit of U.S. Provisional Patent Application Ser. No. 60/465,432 filed Apr. 25, 2003, and the subject matter thereof is hereby incorporated herein by reference thereto.

TECHNICAL FIELD

The present invention relates generally to manufacturing integrated circuits, and more particularly to solder-reflow system for manufacturing integrated circuits.

BACKGROUND ART

In the electronics industry, the continuing goal has been to reduce the size of electronic devices, such as camcorders and portable telephones, while increasing performance and speed. Integrated circuit devices for complex electronic systems typically are incorporated into packages that are then mounted on printed circuit wiring boards (PCBs) using solder bump technology Solder bump technology involves printing a solder paste on input/output pads on the integrated circuit packages and heating the solder paste to a temperature equal to or greater than that of its melting point in a "reflow" process.

The reflow process has been long used to connect electronic components having input/output pins onto a PCB and many types of reflow ovens have been developed. However, PCB reflow for solder bump technology is a more complex operation that, as a result, requires an oven that is larger, more complex and more expensive than is necessary for conventional reflow.

The solder-reflow step involves four phases: preheat, activate, reflow, and cooling. First, in the preheat phase the solder paste is warmed to a temperature that is just below the melting point of the solder, below about 183° C., in a nitrogen atmosphere. In the activate phase, the flux that is used to adhere the solder to the solder pads is activated to remove oxide on the pads, and the temperature of the substrate and the solder are allowed to become more uniform and stabilized. During this activate phase the temperature of the solder and the substrate is nearly constant or may increase slightly. In the reflow phase, the temperature is caused to increase rapidly and exceed the melting point so as to melt the solder and wet the solder pads. To prevent oxidation, a huge volume of nitrogen is required to purge the oven used for the reflow. Finally, in the cooling phase, the solder and the substrate are allowed to cool to a temperature well below the melting point of the solder such that the solder solidifies and the reflow process is complete.

A problem with the solder bump process is that the solder paste contains the flux, and when the solder melts, it forms bumps that contain empty voids resulting from the dissolution of the flux. It has been found that in excess of 30% of the volume of a solder bump may be empty voids, which weakens the solder connection and increases the electrical resistance of the solder bump.

Another problem with the solder bump process is that a large amount of time is required to start and complete the nitrogen atmosphere formation and purge. The time requirement slows down the throughput of the system.

Solutions to these problems have been long sought but prior developments have not taught or suggested any solutions and, thus, solutions to these problems have long eluded those skilled in the art.

DISCLOSURE OF THE INVENTION

The present invention provides a system for reflow soldering a part that includes: replacing air around an unsoldered part with a first inert gas; removing the first inert gas to form a vacuum around the unsoldered part; vacuum reflow soldering the unsoldered part to form a reflow-soldered part; providing a second inert gas to fill the vacuum around the reflow-soldered part; and replacing the second inert gas with air around the reflow-soldered part.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

Figure 1:
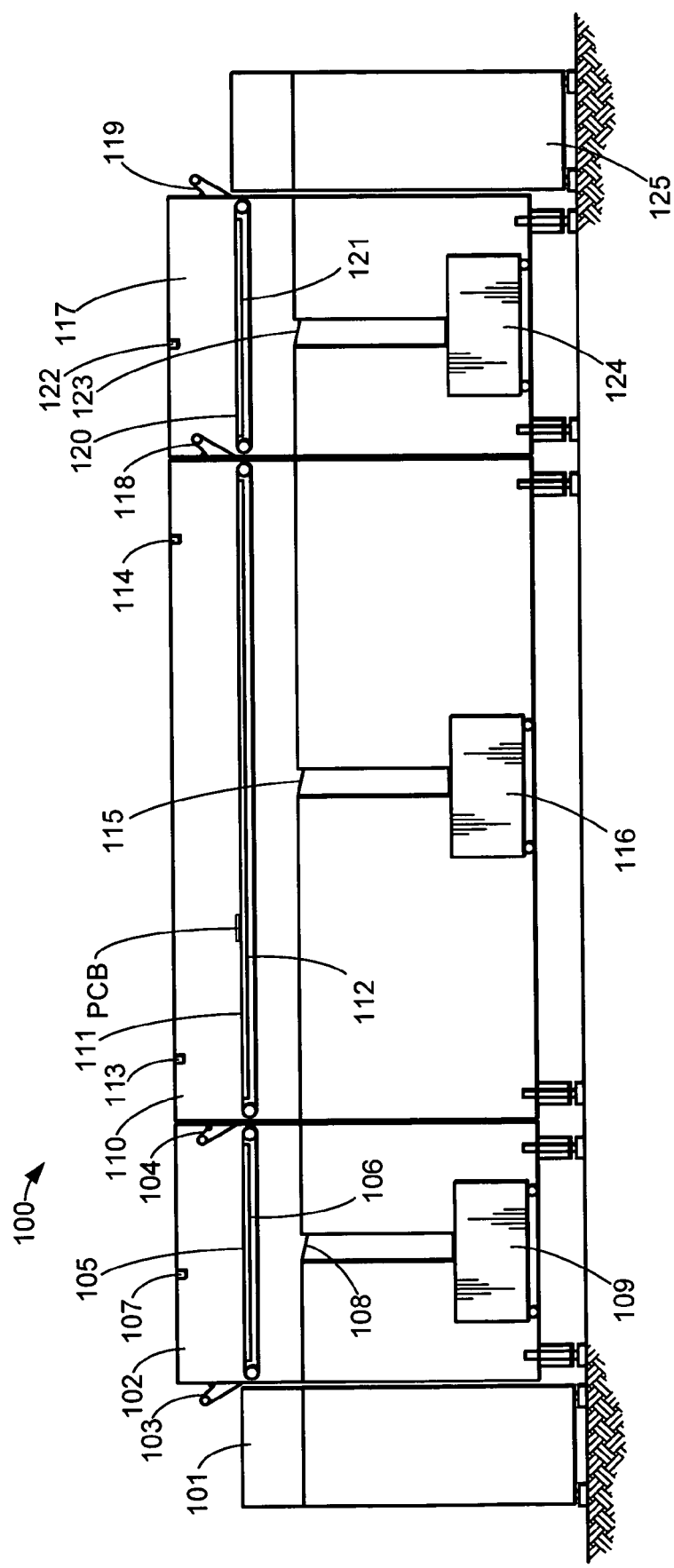
FIG. 1 is a view of a horizontal solder-reflow system in accordance with one embodiment of the present invention.

In the following description, numerous specific details are given to provide a thorough understanding of the invention. However, it will be apparent to one skilled in the art that the invention may be practiced without these specific details. In order to avoid obscuring the present invention, some well-known configurations and process steps are not disclosed in detail. In addition, the drawings showing embodiments of the apparatus are semi-diagrammatic and not to scale and, particularly, some of the dimensions are for the clarity of presentation and may be exaggerated in the drawing FIGs.

The term "horizontal" as used herein is defined as a plane parallel to the ground. The term "vertical" refers to a direction perpendicular to the horizontal as just defined. Terms, such as "on", "above", "below", "bottom", "top", "side", "end", "higher", "lower", "over", and "under", are defined with respect to the horizontal plane.

Referring now to FIG. 1, therein is shown a horizontal solder-reflow system 100 in accordance with an embodiment of the present invention. A loading unit 101 has unsoldered parts, such as unsoldered printed circuit boards carrying unsoldered integrated circuit packages, loaded after solder printing. Solder printing is a process for placing solder paste for solder bumps on the integrated circuit packages. The loading unit 101 can be a separate system or integral with the horizontal solder-reflow system 100 and carries unsoldered parts.

A loading lock 102 is a unit having sealable doors 103 and 104. The loading lock 102 contains a conveyor 105, such as a belt, for loading parts through the sealable door 103 into the loading lock 102. The temperature of the parts on the conveyor is controlled by a heat source 106, such as a chuck/hot plate, from room temperature, about 20° C. up to above about 450° C.

A gas source 107 is connected to replace air and fill the loading lock 102 with an inert gas, such as nitrogen or a forming gas of nitrogen/hydrogen. The pressure of the inert gas is controllable over a wide range in the loading lock 102

A throttle valve 108 is also connected to the loading lock 102 to allow removal of air or inert gas and to allow drawing the loading lock 102 down to a vacuum using a vacuum/purge pump 109. The vacuum/purge pump 109 may be a single pump or a number of pumps just as the gas source 107 can be a single source as shown in FIG. 1 or a number of different sources to reduce the loading lock 102 to below atmospheric pressure. The throttle valve 108 further permits the loading lock 102 to be filled with air or inert gas to fill the vacuum.

A reflow unit 110 is connected to the loading lock 102 by the sealable door 104 to allow access of unsoldered parts into the reflow unit 110 onto a reflow conveyor system 111. The reflow unit 110 may include an optional conduction or convection heating unit 112. In the conduction unit, there will be a conductive heating source, such as a chuck/hot plate, and in the convection unit there will be a convective heating source, such as a heater and blower combination to provide a controlled volume of inert gas for convention heating.

The reflow unit 110 will have several different temperature zones in order to provide the parts with a varying temperature profile.

In the reflow unit 110, the reflow conveyor system 111 moves in a horizontal direction carrying a part, represented by a printed circuit board PCB. This allows a reduction in the height of the horizontal solder-reflow system 100.

Gas sources 113 and 114 are connected to fill the reflow unit 110 with an inert gas. A throttle valve 115 is also connected to the reflow unit 110 to allow removal of air or inert gas or to allow drawing the reflow unit 110 down to a vacuum using a vacuum/purge pump 116.

Prior to operation, the reflow unit 110 will generally be filled with inert gas to flush out air before being purged to the vacuum or low-pressure inert gas level that will be maintained during operation.

An unloading lock 117 is a unit having sealable doors 118 and 119. The unloading lock 117 contains a conveyor 120 for unloading solder-reflowed parts through the sealable door 118 into the unloading lock 117. The temperature of the solder-reflowed parts on the conveyor is controlled by a cooling source 121, such as a chuck/cold plate, to bring the parts down to ambient temperature in a controlled fashion as required by the particular parts being processed.

A gas source 122 is connected to fill the unloading lock 117 with an inert gas. A throttle valve 123 is also connected to the unloading lock 117 to allow removal of air or inert gas, or to draw the unloading lock 117 down to a vacuum using a vacuum/purge pump 124. The throttle valve 123 further permits the unloading lock 117 to be filled with air or inert gas to fill the vacuum.

The unloading lock 117 is unloaded through the sealable door 119 so that the vacuum solder-reflowed parts are placed onto an unloading unit 125. The unloading unit 125 can be a separate system or integral with the horizontal solder-reflow system 100 and carries solder-reflowed parts.

Thus, the horizontal solder-reflow system 100 generally includes the loading lock 102, the reflow unit 110, and the unloading lock 117, each of which is capable of being open to air, filled with an inert gas, and/or evacuated to a vacuum. The inert gas for the unloading lock 117 can be the same as or different from the inert gas used in the loading lock 102.

In operation, unsoldered parts after solder printing of the printed circuit boards are loaded on the loading unit 101. These unsoldered parts are then brought to the horizontal solder-reflow system 100. The loading lock 102 is filled with the inert gas. After pressure of inert gas in the loading lock 102 is equal to atmospheric pressure, the sealable door 103 is opened and the unsoldered parts are moved into the inert gas environment of the loading lock 102 by the conveyor 105.

The sealable door 103 is then closed and the throttle valve 108 opened in order to evacuate the loading lock 102 by means of the vacuum/purge pump 109. During the evacuation process, the unsoldered parts sit on the heat source 106 in order to be brought to a uniform temperature.

When the vacuum in the loading lock 102 is equal to the vacuum established or maintained in the reflow unit 110, the sealable door 104 is opened and the conveyor 105 transfers the unsoldered parts to the reflow conveyor system 111 in the reflow unit 110. During operation, the vacuum is maintained in the reflow unit 110.

In the reflow unit 110, the several different heating zones determined by the conduction or convection unit heat the parts to cause solder-reflow. The reflow conveyor system 111 moves the unsoldered part through the zones continuously in the vacuum to start and finish the solder-reflow process. During the process, solder activation occurs above about 180° C. to over about 350° C. Then, the solder on the printed circuit boards is reflowed in the vacuum, preferably, or in the low-pressure inert gas to solder the unsoldered integrated circuit packages to the printed circuit boards. During the reflow process, the throttle valve 115 is open to allow the vacuum/purge pump 116 to maintain the vacuum or low-pressure inert gas and draw out solder flux gases. The pressure, temperatures, and other processing conditions are controllable as required by the parts being processed.

The unloading lock 117 has the throttle valve 123 open in order to allow the vacuum/purge pump 124 to create a vacuum or low-pressure in the unloading lock 117 by drawing out the inert gas. When the vacuum or pressure level is the same in the reflow unit 110 and in the unloading lock 117, the sealable door 118 is opened and the solder-reflowed integrated circuit boards with the soldered integrated circuit packages are transferred to the conveyor 120 in the unloading lock 117.

When the solder-reflowed parts are transferred to the unloading lock 117, the sealable door 118 and the sealable door 119 are closed along with the throttle valve 123. The inert gas is provided from the gas source 122 to fill the vacuum and to bring the pressure of the inert gas in the unloading lock 117 up to atmospheric pressure. At the same time, the cooling source 121 begins to cool down the temperature of the solder-reflowed parts down to ambient temperature as required for the particular parts. Thus, the solder-reflowed parts will not be subject to the oxidizing affects of air until they are at ambient temperature where the effects will be minimal.

When the pressure in the unloading lock 117 is at atmospheric pressure, the throttle valve 123 is closed and the sealable door 119 is opened. The solder-reflowed printed circuit boards are then transferred from the conveyor 120 to the unloading unit 125.

It will be evident from the above disclosure that the loading lock 102 and the unloading lock 117 do not have to be completely purged or filled in order to perform in accordance with an embodiment of the present invention.

As examples, the loading lock 102 does not have to be completely purged of the inert gas for loading the reflow unit 110 and the unloading lock 117 does not have to be completely purged of inert gas for unloading. The reflow unit 110 is large, but does not have to be filled and purged of inert gas or air during each cycle because the vacuum is maintained. This means that larges volumes of the inert gas are no longer expended and the processing time from start to finish has been substantially reduced.

Figure 2:
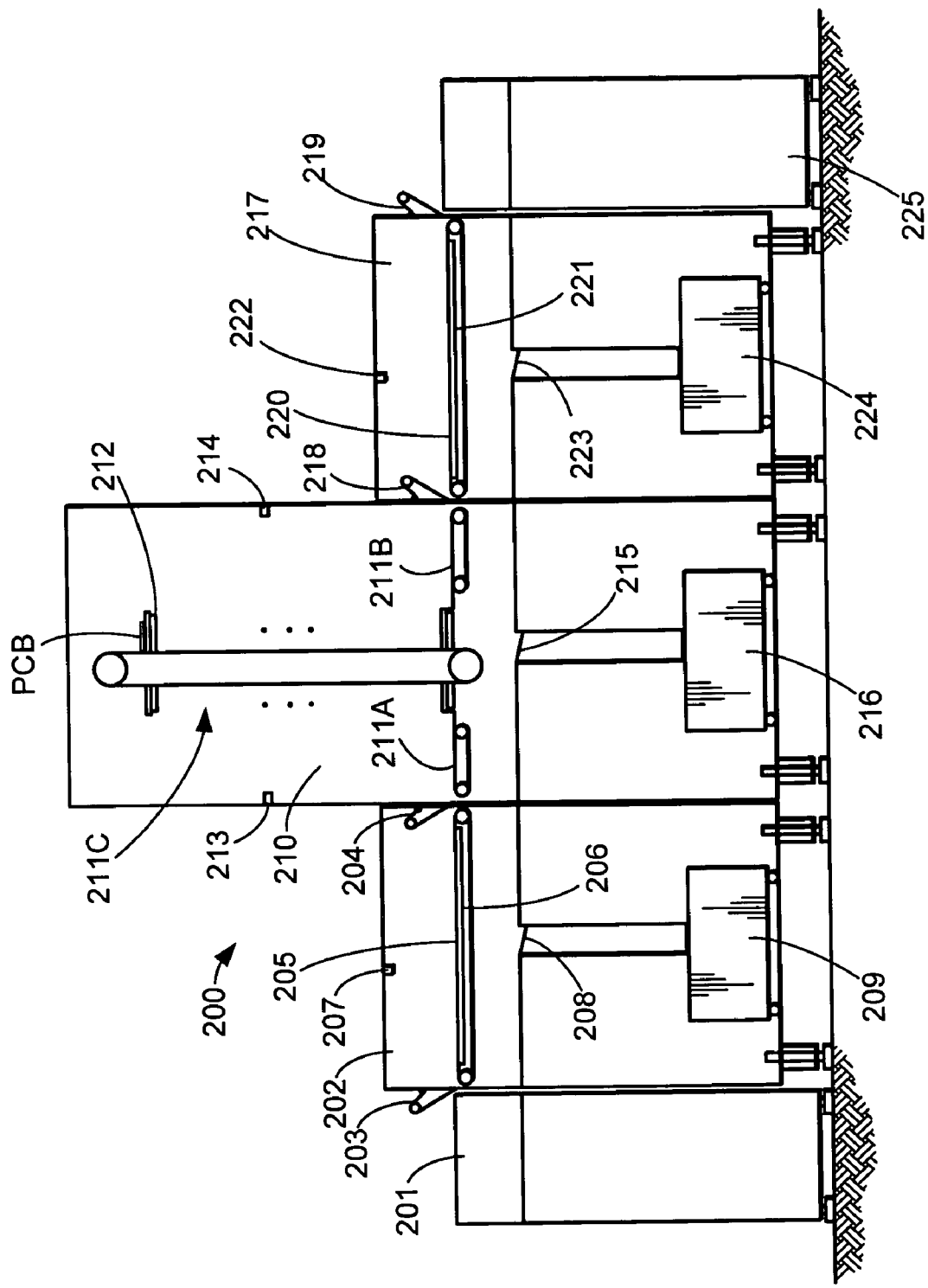
FIG. 2 is a view of a vertical solder-reflow system in accordance with another embodiment of the present invention.

Referring now to FIG. 2, therein is shown a vertical solder-reflow system 200 in accordance with an embodiment of the present invention. A loading unit 201 has unsoldered parts, such as unsoldered printed circuit boards carrying unsoldered integrated circuit packages, loaded after solder printing. Solder printing is a process for placing solder paste for solder bumps on the integrated circuit packages. The loading unit 201 can be a separate system or integral with the vertical solder-reflow system 200 and carries unsoldered parts.

A loading lock 202 is a unit having sealable doors 203 and 204. The loading lock 202 contains a conveyor 205, such as a belt, for loading parts through the sealable door 203 into the loading lock 202. The temperature of the parts on the conveyor is controlled by a heat source 206, such as a chuck/hot plate.

A gas source 207 is connected to fill the loading lock 202 with an inert gas.

A throttle valve 208 is also connected to the loading lock 202 to allow removal of air or inert gas and to allow drawing the loading lock 202 down to a vacuum using a vacuum/purge pump 209. The vacuum/purge pump 209 may be a single pump or a number of pumps just as the gas source 207 can be a single source as shown in FIG. 2 or a number of different sources.

The throttle valve 208 further permits the loading lock 202 to be filled with air or inert gas to fill the vacuum.

A reflow unit 210 is connected to the loading lock 202 by the sealable door 204 to allow access of unsoldered parts into the reflow unit 210 onto a reflow conveyor system 211. The reflow unit 210 may include optional conduction or convection heating units 212. In the conduction unit, there will be a conductive heating source, such as a chuck/hot plate, and in the convection unit there will be a convective heating source, such as a heater and blower combination.

The reflow unit 210 will have several different temperature zones in order to provide the parts with a varying temperature profile.

In the reflow unit 210, the reflow conveyor system 211 consists of two conveyors 211A and 211B that move in horizontal directions and a conveyor 211C that moves in a vertical direction carrying a part, represented by a printed circuit board PCB. This allows a reduction in the length of the vertical solder-reflow system 200.

Gas sources 213 and 214 are connected to fill the reflow unit 210 with an inert gas. A throttle valve 215 is also connected to the reflow unit 210 to allow removal of air or inert gas and to allow drawing the reflow unit 210 down to a vacuum using a vacuum/purge pump 216. Prior to operation, the reflow unit 210 will generally be filled with inert gas to flush out air before being purged to the vacuum that will be maintained during operation.

An unloading lock 217 is a unit having sealable doors 218 and 219. The unloading lock 217 contains a conveyor 220 for unloading solder-reflowed parts through the sealable door 218 into the unloading lock 217. The temperature of the solder-reflowed parts on the conveyor is controlled by a cooling source 221, such as a chuck/cold plate, to bring the parts uniformly down to ambient temperature.

A gas source 222 is connected to fill the unloading lock 217 with an inert gas. A throttle valve 223 is also connected to the unloading lock 217 to allow removal of air or inert gas and draw the unloading lock 217 down to a vacuum using a vacuum/purge pump 224. The throttle valve 223 further permits the unloading lock 217 to be filled with air or inert gas to fill the vacuum.

The unloading lock 217 is unloaded through the sealable door 219 so that the vacuum solder-reflowed parts are placed onto an unloading unit 225. The unloading unit 225 can be a separate system or integral with the vertical solder-reflow system 200 and carries solder-reflowed parts.

Thus, the vertical solder-reflow system 200 generally includes the loading lock 202, the reflow unit 210, and the unloading lock 217, each of which is capable of being open to air, filled with an inert gas, and/or evacuated to a vacuum. The inert gas for the unloading lock 217 can be the same as or different from the inert gas used in the loading lock 202.

In operation, unsoldered parts after solder printing of the printed circuit boards are loaded on the loading unit 201. These unsoldered parts are then brought to the vertical solder-reflow system 200. The loading lock 202 is filled with the inert gas. After pressure of inert gas in the loading lock 202 is equal to atmospheric pressure, the sealable door 203 is opened and the unsoldered parts are moved into the inert gas environment of the loading lock 202 by the conveyor 205.

The sealable door 203 is then closed and the throttle valve 208 opened in order to evacuate the loading lock 202 by means of the vacuum/purge pump 209. During the evacuation process, the unsoldered parts sit on the heat source 206 in order to be brought to a uniform temperature.

When the vacuum in the loading lock 202 is equal to the vacuum established or maintained in the reflow unit 210, the sealable door 204 is opened and the conveyor 205 transfers the unsoldered parts to the reflow conveyor system 211 in the reflow unit 210. The unsoldered parts are received by the conveyor 211A. The conveyor 211A transfers the unsoldered parts to the conveyor 211C, which moves vertically while reflow solder occurs. During operation, the vacuum is maintained in the reflow unit 210.

In the reflow unit 210, the several different heating zones determined by the conduction or convection unit heat the parts to cause solder-reflow. The conveyor system 211C moves the unsoldered parts up and down through the zones continuously in the vacuum or low-pressure inert gas to cause solder activation and to start and finish the solder-reflow process. During the process, the solder on the printed circuit boards is reflowed in the vacuum or low-pressure inert gas to solder the unsoldered integrated circuit packages to the printed circuit boards. During the reflow process, the throttle valve 215 is open to allow the vacuum/purge pump 216 to maintain the vacuum and draw out solder flux gases. This causes significant reduction in or elimination of voids in the solder.

The unloading lock 217 has the throttle valve 223 open in order to allow the vacuum/purge pump 224 to create a vacuum in the unloading lock 217 by drawing out the inert gas. When the vacuum level is the same in the reflow unit 210 and in the unloading lock 217, the sealable door 218 is opened and the solder-reflowed parts, or solder-reflowed integrated circuit boards with the soldered integrated circuit packages, are transferred by the conveyor 211B to the conveyor 220 in the unloading lock 217.

When the solder-reflowed parts are transferred to the unloading lock 217, the sealable door 218 and the sealable door 219 are closed along with the throttle valve 223. The inert gas is provided from the gas source 222 to fill the vacuum and to bring the pressure of the inert gas in the unloading lock 217 up to atmospheric pressure. At the same time, the cooling source 221 begins to cool down the temperature of the solder-reflowed parts down to ambient temperature. Thus, the solder-reflowed parts will not be subject to the oxidizing affects of air until they are at ambient temperature.

When the pressure in the unloading lock 217 is at atmospheric pressure, the throttle valve 223 is closed and the sealable door 219 is opened. The solder-reflowed printed circuit boards are then transferred from the conveyor 220 to the unloading unit 225.

It will be evident from the above disclosure that the loading lock 202 and the unloading lock 217 do not have to be completely purged or filled in order to perform in accordance with an embodiment of the present invention.

As examples, the loading lock 202 does not have to be completely purged of the inert gas for loading the reflow unit 210 and the unloading lock 217 does not have to be completely purged of inert gas for unloading. The reflow unit 210 is large, but does not have to be filled and purged of inert gas or air during each cycle because the vacuum is maintained. This means that larges volumes of the inert gas are no longer expended and the processing time from start to finish has been substantially reduced.

Based on the above, it will be apparent that the horizontal solder-reflow system has a lower vertical profile, while the vertical solder-reflow system has a shorter horizontal profile.

At the same time, it will be understood that unsoldered integrated circuit packages and printed circuit boards may be fed in from either end of both systems by changing the directions of the conveyors. Further, it will be understood that in some situations it may be desirable to feed in unsoldered integrated circuit packages and printed circuit boards from the same direction that they are fed out in order to have a much shorter system by using one lock as both the loading and unloading lock. Also, the present invention allows substantially continuous feed of parts in from the loading unit end through the reflow unit to the unloading unit end of the system.

Figure 3:
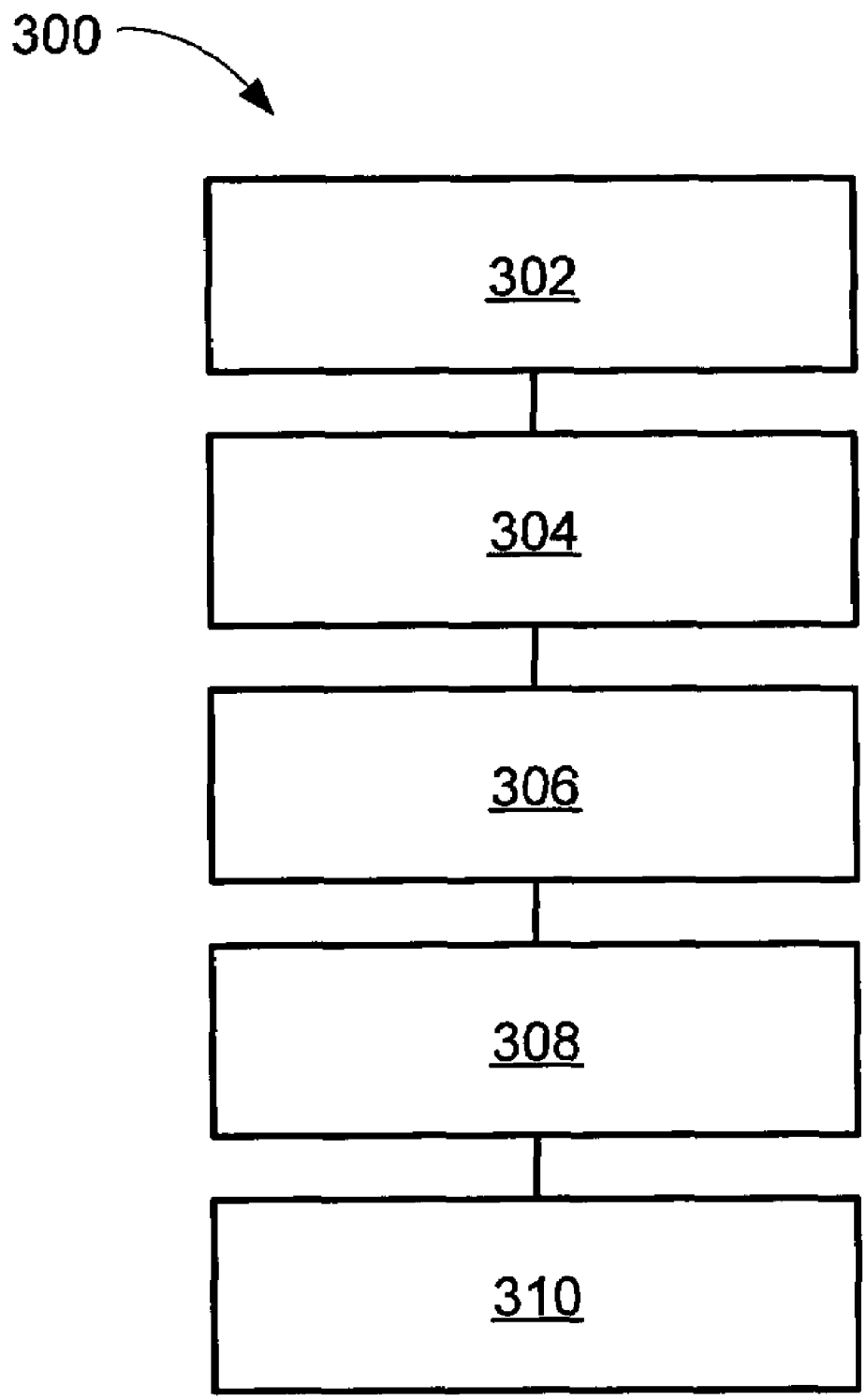
FIG. 3 is a method in accordance with the present invention.

Referring now to FIG. 3, therein is shown the method 300 of the present invention includes replacing air around an unsoldered part with a first inert gas in a block 302; removing the first inert gas to form a vacuum around the unsoldered part in a block 304; vacuum reflow soldering the unsoldered part to form a reflow-soldered part in a block 306; providing a second inert gas to fill the vacuum around the reflow-soldered part in a block 308; and replacing the inert gas with air around the reflow-soldered part in a block 310.

It has been discovered that it is possible to reduce the empty void level on the reflowed solder significantly using the present invention. Approximately 90% of the solder bumps formed have less than 10% empty voids, and 10% of the solder bumps have less than 20% empty voids as a percentage of volume. The maximum acceptable empty voids are 30% empty voids as a percentage of volume to provide acceptable conductivity.

Further, the substantial heating and cooling times, as well as the vacuum/purge pumping times, have been significantly reduced compared to batch-type reflow ovens.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hither-to-fore set forth herein or shown in the accompanying drawings are to be interpreted in an illustrative and non-limiting sense.

The invention claimed is:

1. A method for reflow-soldering a part:
   replacing air around an unsoldered part with a first inert gas;
   removing the first inert gas to form a vacuum around the unsoldered part;
   vacuum reflow soldering the unsoldered part to form a reflow-soldered part;
   providing a second inert gas to fill the vacuum around the reflow-soldered part; and
   replacing the second inert gas with air around the reflow-soldered part.

2. The method as claimed in claim 1 wherein:
   the first and second inert gases are the same gas.

3. The method as claimed in claim 1 wherein:
   vacuum reflow soldering comprises heating around an integrated circuit package on a printed circuit board having solder paste printed thereon at a plurality of different temperatures in the vacuum.

4. The method as claimed in claim 1 wherein:
   removing the first inert gas includes simultaneously heating an integrated circuit package on a printed circuit board having solder paste printed thereon at a plurality of different temperatures; and
   replacing the second inert gas includes simultaneously cooling the integrated circuit package on the printed circuit board having solder thereon at a plurality of different temperatures.

5. The method as claimed in claim 1 comprising:
   moving an integrated circuit package on a printed circuit board in at least one direction of horizontally, vertically, and a combination thereof from replacing the air, removing the first inert gas, reflow soldering, providing the second inert gas, through replacing the second inert gas.

6. A method for reflow soldering an integrated circuit package on a printed circuit board comprising:
   replacing air with a first inert gas around the integrated circuit package on the printed circuit board;
   removing the first inert gas to form a vacuum around the integrated circuit package on the printed circuit board;
   moving in a first move the integrated circuit package on the printed circuit board;
   vacuum reflow soldering the integrated circuit package on the printed circuit board;
   moving in a second move the integrated circuit package on the printed circuit board;
   providing a second inert gas to fill the vacuum around the integrated circuit package on the printed circuit board;
   replacing the second inert gas with air around the integrated circuit package on the printed circuit board;
   moving in a third move the integrated circuit package on the printed circuit board; and
   filling the vacuum with air, the first inert gas, or the second inert gas in respective first, second, or third moves after moving the integrated circuit package on the printed circuit board.

7. The method as claimed in claim 6 wherein:
   vacuum reflow soldering provides the integrated circuit package on the printed circuit board having solder bumps with 90% of the solder bumps formed having less than 10% empty voids and 10% of the solder bumps having less than 20% empty voids as a percentage of volume.

8. The method as claimed in claim 6 wherein:

vacuum reflow soldering comprises heating around the integrated circuit package on the printed circuit board having solder paste printed thereon at a plurality of different temperatures in the vacuum.

9. The method as claimed in claim 6 wherein:

removing the first inert gas includes simultaneously heating the integrated circuit package on the printed circuit board having solder paste printed thereon at a plurality of different temperatures; and replacing the second inert gas includes simultaneously cooling the integrated circuit package on the printed circuit board having solder thereon at a plurality of different temperatures in the unloading unit after moving the integrated circuit package on the printed circuit board in the first move.

10. The method as claimed in claim 6 comprising:

moving the integrated circuit package on the printed circuit board in at least one direction of horizontal, vertical, and a combination thereof.

* * * * *